United States Patent [19]

Nagakubo et al.

[11] 4,286,199
[45] Aug. 25, 1981

[54] HELICAL SCAN RECORDER HAVING CAPSTAN MOTOR SPEED RESPONSIVE TO A FREQUENCY OF A COMMAND SIGNAL

[75] Inventors: Yoshio Nagakubo, Kanagawa; Masayuki Takano, Tokyo, both of Japan

[73] Assignee: Sony Corporation, Tokyo, Japan

[21] Appl. No.: 116,586

[22] Filed: Jan. 29, 1980

[30] Foreign Application Priority Data

Feb. 8, 1979 [JP] Japan .................................. 54-13607
Feb. 8, 1979 [JP] Japan .................................. 54-13608

[51] Int. Cl.³ ............................................. H02P 5/16
[52] U.S. Cl. .................................. 318/327; 318/269; 318/314; 318/318; 318/302
[58] Field of Search ............... 318/326, 327, 328, 269, 318/604, 258, 302, 318, 314

[56] References Cited

U.S. PATENT DOCUMENTS

| | | | |
|---|---|---|---|
| 3,497,786 | 2/1970 | Lombardo | 318/269 |
| 3,579,065 | 5/1971 | Laukatis | 318/314 |
| 3,629,677 | 12/1971 | Means | 318/327 |
| 3,654,479 | 4/1972 | Catherin | 318/318 |
| 3,800,196 | 3/1974 | Zimmermann | 318/328 |
| 4,034,274 | 7/1977 | Akima | 318/328 |

Primary Examiner—David Smith, Jr.
Attorney, Agent, or Firm—Hill, Van Santen, Steadman, Chiara & Simpson

[57] ABSTRACT

In a helical scan video tape recorder, a capstan motor is speed-controlled in response to a command frequency of a command signal under a special reproducing mode called a SEARCH MODE. A speed servo loop for the capstan motor for this purpose includes a pair of pulse converters and a pair of integrating circuits for comparing the command signal and a rotation signal generated by a frequency generator attached to the capstan motor. A time constant of the integrating circuit for the command signal path is selected to be smaller than that of the integrating circuit for the rotation signal, so that the capstan motor is driven in a pulse drive mode below a predetermined speed.

2 Claims, 5 Drawing Figures

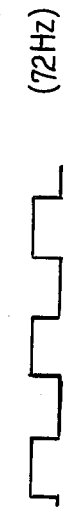
Fig. 2A (720 Hz)
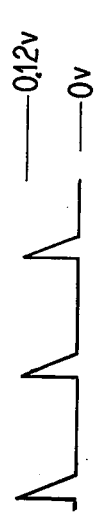
Fig. 2B — 0.12v / 0v
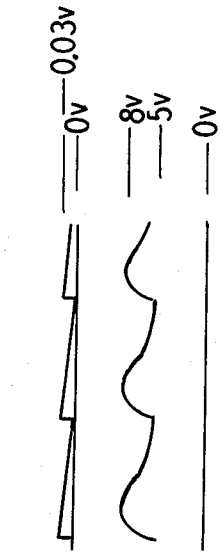
Fig. 2C — 0v—0.03v
Fig. 2D — 5v / 6v / 0v
Fig. 3A (3600 Hz)
Fig. 3B — 0v—0.04v—0.08v
Fig. 3C — 0v—0.01v—0.02v
Fig. 3D — 7v / 0v
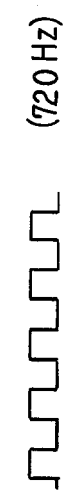
Fig. 4A (72Hz)
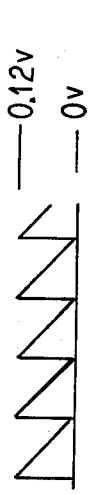
Fig. 4B — 0.12v / 0v
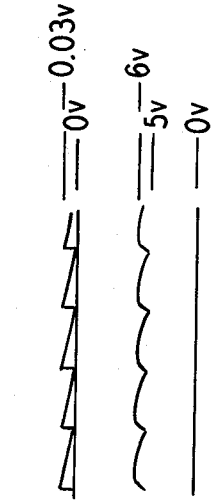
Fig. 4C — 0v—0.03v
Fig. 4D — 8v / 5v / 0v
Fig. 5A (12Hz)
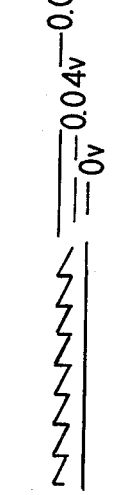
Fig. 5B — 0.12v / 0v
Fig. 5C — 0v—0.03v
Fig. 5D — 10v / 5v / 0v

HELICAL SCAN RECORDER HAVING CAPSTAN MOTOR SPEED RESPONSIVE TO A FREQUENCY OF A COMMAND SIGNAL

BACKGROUND OF THE INVENTION

Recently, electric editing has been very popular in a video tape recording field. In order to determine exact points for cut in and cut out for editing purpose, a helical scan video tape recorder (VTR) is required with a function of special reproducing modes such as slow motion, stop motion, etc. Such modes are called SEARCH MODES wherein a video tape is advanced by a capstan-and-pinch roller assembly. For the sake of searching purpose, the video tape has to be advanced from a stop mode up to 5 times the normal playback mode, continuously. A capstan motor for the capstan-pinch roller assembly is a dc motor, and a linear speed control between zero speed to high speed is rather difficult without using a switching circuit is which the motor drive and control system is changed over in response to the speed of the motor.

SUMMARY OF THE INVENTION

A primary object of this invention is to provide a new improved motor control circuit for a dc motor.

A secondary object of this invention is to provide a novel dc motor speed control circuit in which the rotational speed of the dc motor is determined in response to the frequency of a command signal.

A further object of this invention is to provide a useful dc motor speed control circuit, where the dc motor is pulse-driven below a predetermined rotational speed, and is voltage-driven above the predetermined speed. The dc motor has a frequency generator which generates a rotational pulse, while a speed command is supplied to the speed control circuit in a form of a frequency signal.

Both signals are supplied to pulse converters and integrating circuits, respectively. Respective output from the integrating circuits is supplied to a differential amplifier, and an output of the differential amplifier becomes a speed error signal, and is supplied to the dc motor.

The most important feature of this invention is to give a relatively small time constant to the integrating circuit for a command signal path relative to a time constant of the integrating circuit for a rotation signal path.

Such arrangement gives ripple-like pulse to the output of the differential amplifier below the predetermined frequency, and such ripple-like pulse is gradually caused to disappear as the rotational speed of the dc motor becomes faster. As a result, the motor drive system is linearly shifted from pulse drive to voltage drive.

BRIEF DESCRIPTION OF THE DRAWINGS

FIGS. 2 to 5 show wave form diagrams of operations for the circuit disclosed in FIG. 1.

DESCRIPTION OF THE PREFERRED EMBODIMENT

Figure 1:
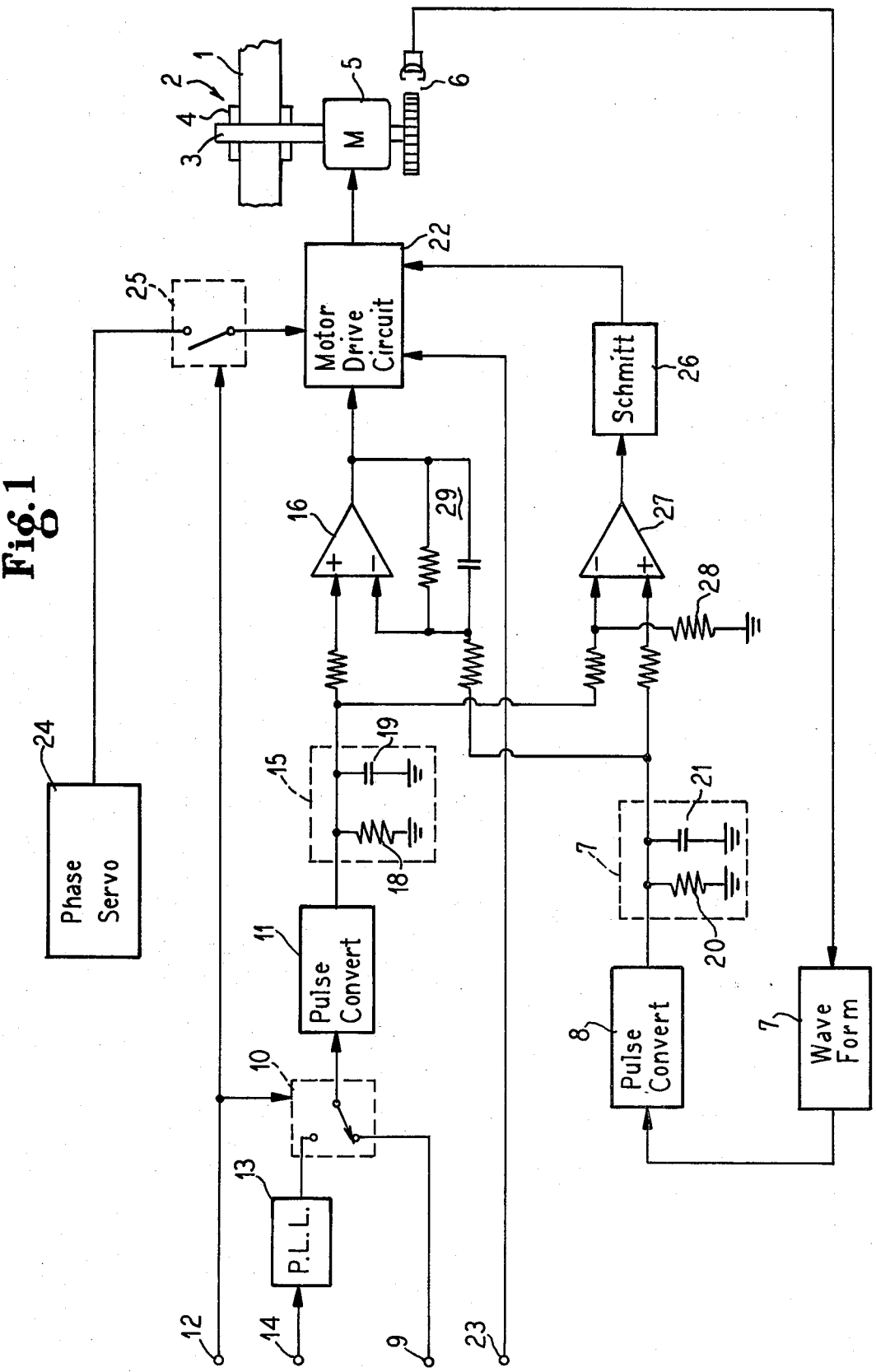
FIG. 1 shows a circuit block diagram of the present invention.

This invention is described in association with a capstan motor speed control circuit for a helical scan video tape recorder which can replay recorded video signal in a slow motion, fast motion, reverse slow, etc. When a video tape is advanced at a normal speed upon playback, such mode is called NORMAL MODE, and when the video tape is advanced at other than normal speed including stop, such mode is called SEARCH MODE, in this specification. This SEARCH MODE is very suitable for searching for the exact frame of video signals in deciding cut-in and cut-out points for electric editing purpose. Under the SEARCH MODE, the video tape is advanced based on a capstan.

In FIG. 1, a video tape 1 is advanced by a capstan pinch roller assembly 2 which includes a capstan 3 and a pinch roller 4. The capstan 3 is driven by a dc capstan motor 5 which has a frequency generator 6. A rotational pulse from the frequency generator 6 is pulse-waveformed at a waveformer 7, and then supplied to a pulse converter 8.

On the contrary, a command signal supplied to a terminal 9 is supplied through a switch 11 to a pulse converter 11.

When the VTR is in the NORMAL MODE, a high potential, for example, is supplied through a terminal 12 to the switch 10, and a moving contact of the switch 10 selects an output of a phase locked loop 13. This phase locked loop 13 receives a vertical drive pulse VD supplied to a terminal 14, and supplies a 720 Hz pulse to the switch 10. Namely, this frequency of 720 Hz commands the motor 5 to advance the tape 1 at normal speed.

Under this NORMAL MODE, the frequency generator 6 also supplied 720 Hz of the rotational pulse to the pulse converter 8.

Respective pulse converters 8, and 11 convert incoming frequency signal into a saw-tooth wave. The output saw-tooth wave from the pulse converter 11 is then fed to a non-inverting input of a differential amplifier 16 through an integrating circuit 15, while the output of the pulse converter 8 is fed to an inverting input of the differential amplifier 16 through an integrating circuit 17. The integrating circuit 15 includes a resistor 18 and a capacitor 19, and the integrating circuit 17 includes a resistor 20 and a capacitor 21, respectively. The differential amplifier 16 supplies an error signal to a motor drive circuit 22. The motor drive circuit 22 further receives a direction command supplied to a terminal 23 and a phase error signal from a capstan phase servo 24 through a switch 25 which is opened when the VTR is under the SEARCH MODE. The motor drive circuit 22 further receives a braking command from a Schmitt circuit 26. Namely, outputs from respective integrating circuits 15 and 21 are also fed to a differential amplifier 27 when the rotation of the motor 5 is much faster than the commanding speed, and the output of the differential amplifier 27 triggers the Schmitt circuit 26, and the Schmitt circuit 26 supplies the braking command to the motor drive circuit 22. A resistor 28 is interposed in a junction point between the integrating circuit 15 and the differential amplifier 27 for attenuation.

The operation of the circuit disclosed herein is described in association with wave form charges in FIG. 2A to 2D through FIG. 5A to 5D. First of all, FIG. 2 shows a set of waveforms under normal tape speed command during the SEARCH MODE. In this case, FIG. 2A shows a command signal applied to the terminal 9. The thus supplied command signal triggers the pulse converter 11, and the converter 11 generates a saw-tooth pulse train. This saw-tooth pulse is fed to the integrating circuit 15 having a predetermined time constant. For this time constant, resistor 18 and the capacitor 19 are respectively selected to be 100 kΩ and 0.11

μF. The output saw-tooth from the integrating circuit 15 is depicted in FIG. 2B, and is supplied to the non-inverting input of the differential amplifier 16. The rotational pulse from the frequency generator 6 is also fed to the integrating circuit 7 through the pulse converter 8. A time constant of the integrating circuit 7 is selected to be large or long relative to the time constant of the integrating circuit 15. For example, the resistor 20 is 100 kΩ and the capacitor 21 is 1 μF.

The output saw-tooth from the integrating circuit 17 is depicted in FIG. 2C, and is supplied to the inverting input of the differential amplifier 16. The amplifier 16 has an integrating capacitor and resistor loop 29 so that the resultant drive signal applied to the motor 5 through the motor drive circuit 22 becomes as shown in FIG. 2D. In the FIG. 2D, the drive signal includes a bias voltage of 5 volts which is superimposed at the motor drive circuit 22. Similarly, FIGS. 3A to 3D show respective waveforms when the tape speed is at 5 times the normal speed regardless of its direction. In this case, the motor drive signal of FIG. 3D has no waves any more. On the contrary, when the tape is advanced at one-tenth (1/10) the normal tape speed, the motor drive signal becomes much more wavy than at normal tape speed, as shown in FIG. 4D.

The tape is advanced at 1/60 the normal tape speed, the motor drive signal becomes pulsative as shown in FIG. 5D.

Namely, the motor drive signal becomes a pulse wave from dc signal gradually, as the tape speed changes from higher speed to lower speed.

When the rotation of the motor 5 is much higher than the commanded rotation, the differential amplifier 27 which operates as a voltage comparator supplies a high level signal to the Schmitt circuit 26 for generating the braking command. The Schmitt circuit 26 has a hysterisis characteristic, and supplies the braking command to the motor drive circuit 22. When the braking command is supplied, the motor drive circuit 22 supplies a braking current to the motor 5, and the motor 5 reduces its rotational speed in accordance with the braking current.

It will be apparent to those skilled in the art that many modifications and variations may be effected without departing from the spirit and scope of the novel concepts of the present invention.

We claim as our invention:

1. A motor speed control circuit for a motor of a video tape machine operable to move the tape at normal or at search mode speeds comprising, a rotational speed generator associated with said motor and producing a series of pulses which have a pulse repetition rate indicative of the motors speed, a motor drive circuit supplying a signal to said motor, a first saw tooth wave generator receiving the output of said rotational speed generator, a first integrating circuit receiving the output of said first saw tooth generator, a phase lock loop generator, a second saw tooth generator receiving either the output of said phase lock loop or a variable frequency search command signal, a second integrating circuit receiving the output of said second saw tooth wave generator, a first comparison circuit receiving the outputs of said first and second integrating circuits on its negative and positive input terminals respectively, and supplying an input to said motor drive circuit, and the time constant of said first integrating circuit being larger than the time constant of said second integrating circuit.

2. A motor speed control circuit according to claim 1 including a second comparison circuit receiving the outputs of said first and second integrating circuits on its positive and negative input terminals, respectively, and supplying a braking signal to said motor through said motor drive circuit.

* * * * *